May 4, 1943.  H. R. GREENLEE ET AL  2,318,481
TRANSMISSION
Filed Dec. 14, 1940      2 Sheets-Sheet 1
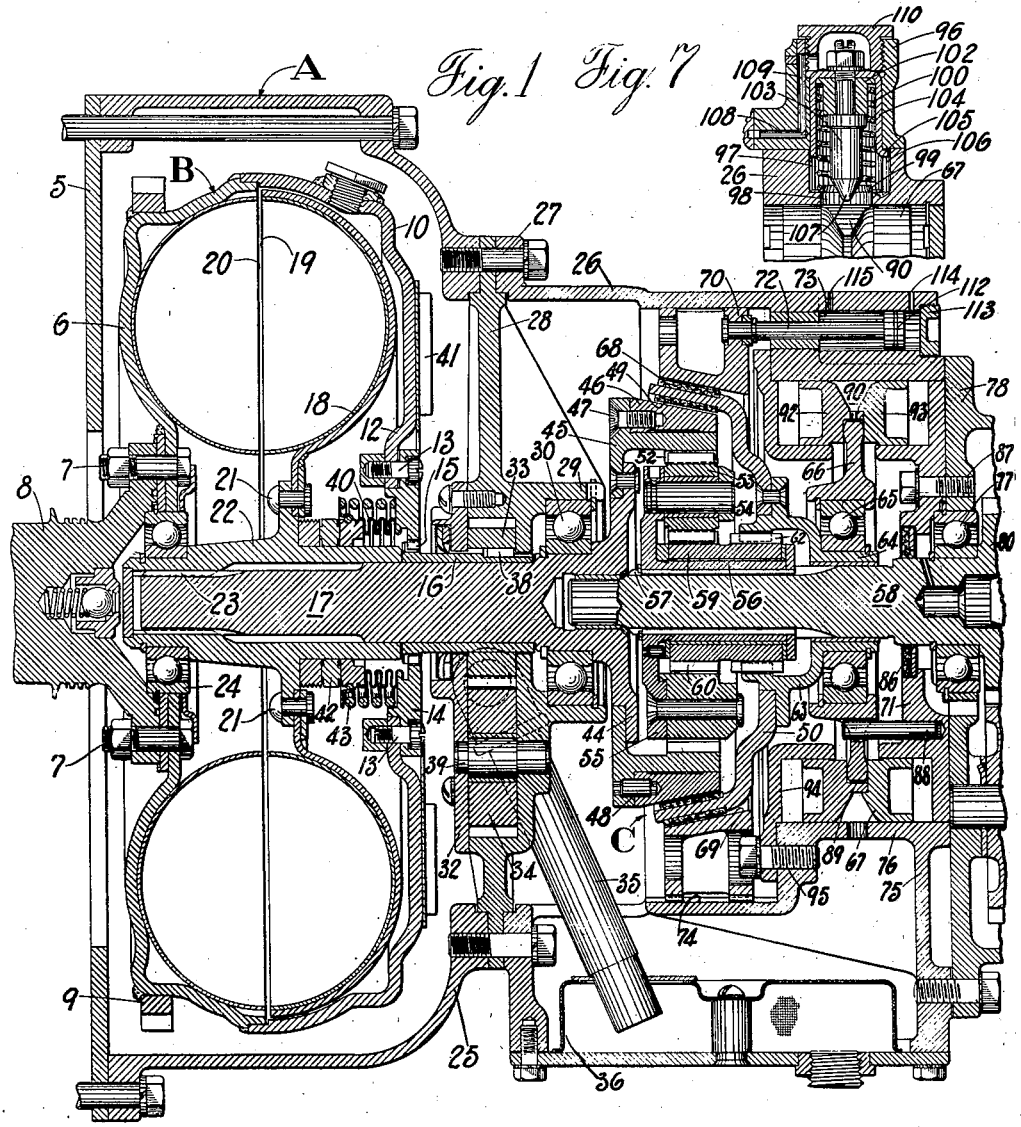
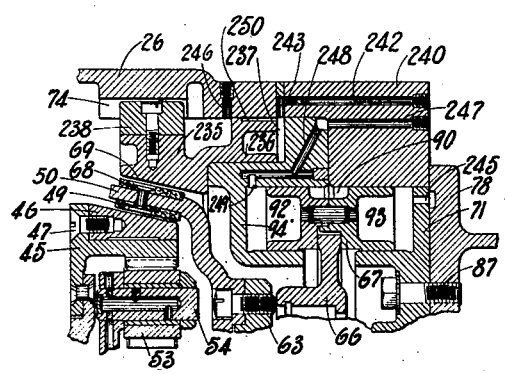
HARRY R. GREENLEE
LOREN D. BRITTON
JOHN R. BOND
INVENTORS
BY Walter E. Schismer
ATTORNEY May 4, 1943. H. R. GREENLEE ET AL 2,318,481
TRANSMISSION
Filed Dec. 14, 1940 2 Sheets-Sheet 2
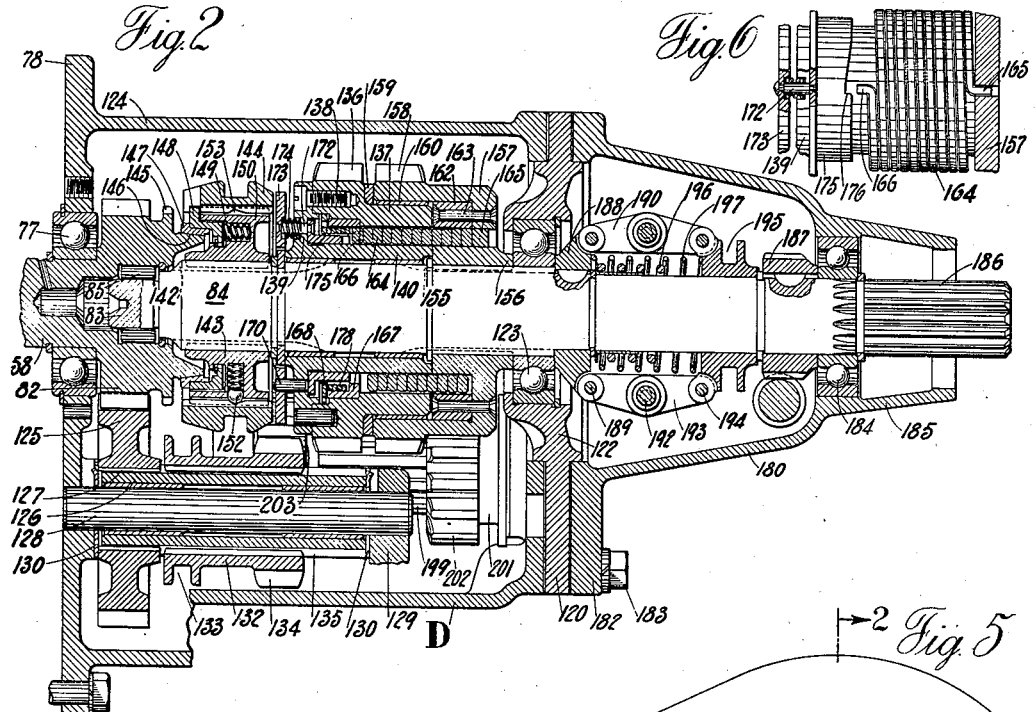
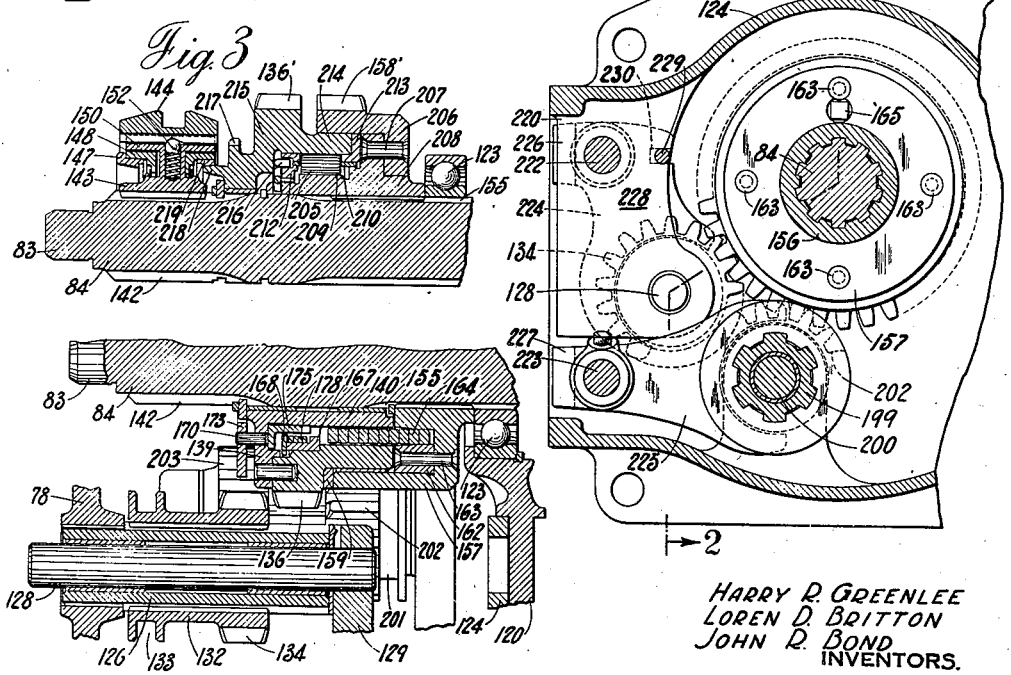
HARRY R. GREENLEE
LOREN D. BRITTON
JOHN R. BOND
INVENTORS.
BY Walter E. Schismer
ATTORNEY Patented May 4, 1943

2,318,481

UNITED STATES PATENT OFFICE 2,318,481

TRANSMISSION

Harry R. Greenlee, South Bend, Loren D. Britton, Mishawaka, and John R. Bond, South Bend, Ind., assignors to The Studebaker Corporation, South Bend, Ind., a corporation of Delaware Application December 14, 1940, Serial No. 370,114

11 Claims. (Cl. 74—290)

This invention relates to transmissions and more particularly is directed to a transmission adaptable for use on automotive vehicles for transmitting torque from the power plant of the vehicle to the driving axle.

The conventional type of transmission now in use in most vehicles comprises a gear transmission having three or more speed ratios provided by trains of gears within a transmission and selected for shifting into various speed ratios under the control of the operator.

Attempts have been made heretofore to provide vehicle transmissions in which the speed ratios are automatically selected in accordance with the load and speed conditions of the vehicle. It is with this latter class of transmission that the present invention is concerned and primarily the present invention is directed to a transmission employing a fluid coupling or clutch to provide for smooth connection of the engine power to the transmission and incorporating therewith a two speed transmission using a planetary underdrive interposed between the clutch and the two speed transmission and capable of functioning in conjunction with the transmission to provide four selective driving ratios.

This produces a transmission which roughly corresponds with the present three speed transmission plus an overdrive, it being contemplated in the present invention that the fourth speed, which is a direct connection between the engine and the propeller shaft, will be comparable to an overdrive in that the gear reduction in the driving axle is reduced so that in effect the same result is attained with a direct drive as has formerly been attained with an overdrive.

It is therefore a primary object of the present invention to provide a four speed transmission by utilizing a relatively small simplified two speed transmission and a planetary underdrive selectively operated in either of the selected speed ratios of the two speed transmission; thus the four speeds are effected as follows: first, or low, drive through the underdrive and the low speed of the two speed transmission; second, a direct drive through the planetary while maintaining the low speed ratio in the transmission; third, underdrive through the planetary with direct drive in the two speed transmission; and fourth, direct drive through both the planetary and the two speed transmission. This reduces to a minimum the shifting operations necessary and, in addition, allows the use of a cone type clutch for optionally shifting the planetary drive into either underdrive or direct drive. This provides a much simpler and easier shift than if a positive shift by conventional type clutch teeth, or even through synchronizer, is required.

It is highly desirable, in transmissions of this type, that over-running of the propeller shaft with respect to the engine shaft be provided during the shifting operation so that there is no braking effect produced by the engine during the shifting operation. The elimination of the braking effect provides a much smoother shift as well as preventing any rapid deceleration of the vehicle during the time that the accelerator pedal is raised as the shift is taking place. The present invention accomplishes this by providing such an overruning connection. In addition, it provides a construction in which after the low speed gear in the two speed transmission has been shifted into position it need not be removed from its engaged position to shift into high speed or direct drive. The overrunning effect is automatically produced whenever the propeller shaft tends to overrun the main drive shaft and provides a very smooth shift without interfering with the accelerating characteristic of the vehicle.

Another advantage, however, in connection with the overruning feature, is the provision of means automatically operable during the shifting operation whereby the motor may be employed as a brake through the transmission, if desired. This may be of advantage in going down long inclines when the braking effect of the motor can be utilized to retard the acceleration of the vehicle, and the present construction embodies such a selective braking mechanism.

In conjunction with a transmission of the present type in which automatic selecting and shifting of the gears by means of a hydraulic or pneumatic shift control arrangement is proposed, it is desirable that a fluid type of coupling or clutch be interposed between the engine and the transmission which coupling is capable of absorbing by slippage the stresses due to abrupt variations in speed ratios produced by the shifting of the gears. Thus, the fluid clutch functions in conjunction with the automatic shifting features of the present transmission providing a very smooth automatically operating transmission. This clutch also allows the shifting of the gearing by the use of cone clutches, synchronizers or the like without the application of a clutch pedal such as is required in connection with the ordinary type of friction disc clutch.

Another very decided advantage produced by the present invention is the provision of an arrangement in the planetary gearing whereby the ring gear of the planetary system can be selectively coupled to the sun gear for locking the planetary in direct drive or the sun gear can be locked to the case when it is desired to provide the underdrive to the planetary. This clutching action is so designed that an overlapping effect can be produced wherein the clutch mechanism functions to couple the ring gear and sun gear simultaneously to the case and then selectively releasing one or the other of the clutching faces whereby a positive clutch action is produced, eliminating any slippage or tendency for chattering or walk-away in this clutching arrangement. This, in turn, eliminates the use of a positive pressure type clutch or the use of clutch springs or the like and prevents wear or slipping of the clutching action whereby all slippage occurs in the fluid coupling.

In a transmission in which overrunning of the propeller shaft with respect to the engine is provided at certain of the speed ratios, it is desirable that a positive reverse drive be provided and the present transmission has such means including a gear on the reverse idler shaft of the transmission which is of the same design as the counter shaft gear for producing reverse drive. This gear, in conjunction with a novel type of clutching mechanism, provides a positive reverse drive through the transmission while yet allowing overrunning in any of the forward speeds. In this connection we prefer to employ a coil spring clutch of the L. G. S. type which can be energized in one direction to produce a clutching action by expansion of the coil springs or can be energized in the opposite direction to produce a clutching action by compression of the coil spring. If desired, however, a conventional form of overrunning clutch may be substituted but in such case additional mechanism must be employed to provide for the positive reverse and also provide for the braking action of the motor.

The two speed transmission itself is of distinctly novel design and is capable of employment either with or without the planetary underdrive and/or the fluid coupling. The tranmission is arranged with a synchronizer and toothed clutch for producing the direct drive between the drive shaft and transmission tail shaft and is provided with a splined gear on the countershaft for producing low speed drive through the transmission. This sliding gear action is so arranged as to remain in meshed position when the direct driving engagement is effected and consequently simplifies the shifting action and readily accommodates it to an automatic control system. In addition, the synchronizer sleeve is arranged to provide means whereby when reversely shifted it will produce a positive reverse drive or may be utilized to produce a braking action of the motor on the tail shaft of the transmission to retard the tail shaft.

In a modified form of the two speed transmission we employ only five gears which will produce forward drive in either one of the two speed ratios and will also produce a reverse drive.

It is contemplated within the purview of the present invention to provide a speed responsive or torque responsive mechanism on the tail shaft of the transmission which, in turn, is adapted to control suitable valving mechanism in accordance with the speed and torque on the propeller shaft for automatically effecting the desired shifting of the transmission and the planetary drive. It is to be understood that the present transmission is adapted for simplified control mechanism which may be either of the positive pressure or vacuum actuated type, although we prefer the former type in which a positive pressure is employed for effecting the various speeds.

Other objects and advantages of the present invention illustrating the simplification of the design, ease of assembly, and adaptation of control mechanism thereto will be more apparent from the following detailed description which, taken in conjunction with the accompanying drawings, will disclose to those skilled in the art the particular construction and operation of a preferred form of the present invention.

In the drawings:

Figure 1 is a sectional view through the forward portion of the transmission showing the fluid clutch and planetary gearing;

Figure 2 is a sectional view taken substantially on line 2—2 of Figure 5 showing the details of the two speed transmission which is driven from the planetary gearing;

Figure 3 is a detail sectional view of a portion of Figure 2 modified to incorporate therein an overrunning clutch;

Figure 4 is a detail sectional view of a further modification of Figure 2 in which one of the gears has been eliminated;

Figure 5 is an end elevational view, partly in section, showing the relative arrangement of the main shaft, countershaft and reverse idler shaft of the transmission;

Figure 6 is a top plan view, partly in section, showing the clutching arrangement for actuating the coil spring clutch;

Figure 7 is a detail sectional view of the neutralizing means for the planetary clutch control means; and Figure 8 is a detail sectional view of another means for actuating the planetary clutch.

Referring now in detail to the drawings, in Figure 1 there is illustrated a housing portion A adapted to be piloted in and bolted to the rear face 5 of the engine block, and which forms a closure for the fluid coupling indicated generally at B. The fluid coupling is adapted to drive the planetary gearing indicated generally at C and a two speed transmission generally indicated at D in Figure 2. From this transmission suitable connection is made through a propeller shaft, torque tube, or the like, to the rear driving axle of the vehicle.

Considering now in detail the structure shown in Figure 1, a fluid coupling B is provided which has its housing portion 6 provided with a radially inwardly directed flange secured to the bolts to the flanged end of the crank shaft 8 of the motor. The housing 6 acts as an impeller or driving part of the fluid coupling B and is thus directly connected to the crank shaft 8 of the engine. It is provided with the starter gear 9 whereby it may be rotated for cranking the engine by means of any suitable starting mechanism.

The opposite side of the housing 6 formed by the cup-shaped member 10 is provided with a radially inturned flange 12 which by means of the studs 13 is secured to a seal supporting member 14 having splined or toothed engagement as indicated at 15 with a sleeve member 16 rotatable on the driving shaft 17. Maintained within the casing 6–10 of the fluid coupling is the rotor member 18, which is provided with a plurality of fins 19 corresponding to the fins 20 of the impeller 6. The member 18 is bolted, or riveted, as at 21, to a sleeve member 22 mounted upon the reduced splined end 23 of the shaft 17. A suitable bearing 24 centers the sleeve 22 within the end of the crank shaft 8 and the opposite end of the sleeve rests upon the shaft 17. It will thus be apparent that whenever the housing 6 is rotated with the fins 20 and 19 filled with oil or a similar fluid, the rotor 18 will tend to rotate therewith thus effecting rotation of the shaft 17. Secured to the rear end flange 25 of the housing A is a substantially annular housing 26 which is bolted to the flange 25 by means of the studs 27, there being an intermediate partition member 28 interposed therebetween. The member 28 has a cylindrical extension 29 provided with a bearing seat for the bearing 30 which centers the opposite end of the shaft 17.

The member 28 has its opposite face provided with an axially extending eccentric recess adapted to be closed by the plate 32 and which receives the meshing gears 33 and 34 of an oil pump. The pump gear draws oil through the conduit 35 from the sump 36 in the bottom of the casing 26 into the pump and then discharges the same under pressure into the fluid impeller in any suitable manner.

By reason of the splined connection 15 between the housing 10 and the sleeve 16, the gear 33 being keyed to the sleeve as indicated at 38, it is apparent that whenever the crank shaft 8 is rotated the gear 33 will be correspondingly rotated and consequently will actuate the pump to provide the desired oil pressure. The gear 34 is journalled upon a stub shaft 39 mounted at its ends in the member 28 and the cap 32.

A suitable bellows type seal 40 is interposed between the sealing member 14 and the external surface of the impeller 6 to prevent loss of fluid therepast. This seal member may be of any desired type although we have found that the best results are attained with a bellows seal such as shown at 40 and a friction surface seal provided by the ring washer 42 and engaged by the coil spring 43. This effectively seals the oil against passage outwardly into the housing A. If desired, the baffles 41 on the casing 10 can be employed for securing circulation of air about the fluid clutch to maintain the same at the desired operating temperature. In such case air would be introduced at the radial inner ends of the blades from a duct in casing 25 and would be expelled outwardly at the top of casing A through suitable apertures therein.

The right-hand end of the shaft 17 is radially enlarged as indicated at 44 and has secured thereto the ring gear 45 of a planetary gearing system. The ring gear 45 is provided with an external shoulder upon which is seated the frusto-conical friction ring 46, this surface being held by means of screws 47 and dowels 48. The friction ring 46 has the external friction surface adapted to be engaged by the clutch surface 49 of a conical clutch and brake member indicated generally at 50. The internal ring gear teeth 52 of the member 45 are adapted to have meshing engagement with the corresponding teeth of the planet pinions 53 carried by means of the shafts 54 upon a planet spider 55 which spider has an extended hub portion 56 having splined engagement with the splined end 57 of a main drive shaft 58.

Rotatably mounted upon the sleeve or hub portion 56 of the spider 55 is a sun gear member 59 which has teeth 60 meshing with the planet pinions 53 and which is provided with an axially spaced set of teeth 62 adapted to have meshing engagement with the member 63. The member 63 is riveted or otherwise secured to the member 50 and has a hub portion 64 rotatably supported by means of a suitable bushing upon the shaft 58. The hub portion 64 of the member 63 has mounted thereon a ball bearing assembly 65 which, in turn, rotatably supports a radially extending member 66 having its outer periphery secured in the annular piston 67. Since the clutch portion 50 of the member 63 is rigidly secured thereto, it is apparent that axial movement of the member 63 will result in moving the friction surface 49 of the member 50 into and out of engagement with the friction ring 46. This produces coupling engagement between the sun gear 59 and the ring gear 45, thereby locking the two together for conjoint rotation to produce a direct drive from the shaft 17 to the shaft 58 through the planet spider.

The member 50 is also provided with an external conical brake surface 68 adapted to engage the corresponding surface 69 of an annular ring member 70 mounted for axial sliding movement within the cage 26 by means of a plurality of circumferentially spaced members 72 extending into the cylinder 73. Suitable internal splines in the cage 26, as indicated at 74, prevent the member 70 from any relative rotation. It will be apparent that when the clutch and brake member 50 is shifted to the right, as shown in Figure 1, to produce a braking engagement between the member 70 and the clutch and brake or torque transmitting member 50, the sun gear 59 will be locked against rotation and consequently underdrive will be effected from the shaft 17 to the shaft 58 through the planetary gearing. Preferably suitable springs (not shown), normally urge the member 70 to the right, as viewed in Figure 1, being biased between plate 28 and the left-hand end face of the member 70.

The rear end of the cage 26 is provided with an end portion 75 which includes an axially extending bore 76. Closing the end of the bore is a bracket member 71 which receives one end of the ball bearing assembly 77 carried by the flanged end 78 of the housing D which encloses the two speed transmission. At its outer end the shaft 58 is radially enlarged as indicated at 80 to provide a drive gear portion 82 and is axially recessed to receive the pilot end 83 of the main transmission shaft 84 which is journalled therein by means of the roller bearings 85. Mounted within the end plate 71 of the bore 76 of the housing 26 is a seal member 86 which seals one end of the bearing 77. The plate 71 is secured to the end of the housing D by means of studs 87.

This member also has secured therein suitable axially extending circumferentially spaced studs 88 which extend through suitable apertures formed in the flange portion of the member 66 to prevent relative rotation of this member so that the periphery of the member 66 may be retained in suitable recesses 89 formed in the annular piston 67. The piston 67 is provided about its external periphery with a substantially V-shaped groove 90 and the opposite ends of the piston are axially recessed as indicated at 92 and 93. The member 71 forms with the bore 76 of the housing 26 and the flange member 94 a suitable annular recess forming a cylinder for reception of the piston 67. The member 94 is secured by means of studs 95 to an offset portion of the bore 76 and forms one end of the cylinder assembly.

Mounted at circumferentially spaced points intermediate the cylinders 73 which control the operation of the pistons 72 are a plurality of neutralizing devices shown more clearly in Figure 7. These are for the purpose of centering the piston 67 relative to the cylinder in such manner that the friction surfaces 68 and 49 are spaced away from the corresponding friction surfaces 69 and 46 so that the member 50 remains in neutral position.

This neutralizing mechanism includes a housing member 96 mounted in any suitable manner on the periphery of the right-hand end of the housing 26 and suitably bored to form the chamber 97. At the base of this chamber there is formed an opening 98 which is disposed substantially adjacent the annular groove 90 in the piston 67. A suitable spring retainer 99 forms a seat for one end of a spring 100 extending vertically in this chamber and biased at its opposite end against the end assembly 102 of a neutralizing plunger 103. The plunger 103 has thereon the cup shaped cap 104 which at one side is provided with a laterally extending ear 105 adapted to slide within the groove 106 for preventing rotation of the assembly. The plunger 103 has a tapered lower end 107 adapted to engage in the groove 90 for centering the piston 67 within the annular cylinder. The neutralizing member is operated by means of fluid pressure communicating with the upper end of the chamber 97 through the ports 108 and 109 formed in the member 96.

The introduction of fluid under pressure through these ports at the top of the chamber closed by the cap 110 results in moving the plunger 103 downwardly against the spring pressure and thus cams the annular piston 67 to a neutral position within its cylinder. By the release of the fluid pressure the spring 100 urges the plunger upwardly to condition the piston for operation. The housing member 96 is adapted for eccentric mounting on the housing 26 to provide for adjusting the neutral position of the piston 67. The details of the functioning of the mechanism will be discussed hereinafter.

Considering now the plurality of cylinders 73 spaced circumferentially about the rounded end of the housing 26, these cylinders are adapted to receive the piston heads 112 of the pistons 72 which actuate the ring member 70. The end of the cylinder is closed by a suitable plug 113. Suitable ports 114 and 115 in the cylinder operate to admit fluid pressure to opposite sides of the piston head 112 for shifting the member 70 axially in opposite directions. The details of this construction and its functions will be described later.

Considering now the structure shown in Figure 2 of the drawings which is the two speed transmission mechanism, the housing 78 of this mechanism is closed at its rear end by a transverse member 120 which member has an offset bearing portion 122 adapted to receive the ball bearing assembly 123 which supports the tail shaft 84 of the transmission. The reduced end of this shaft, as previously described, is piloted by the bearings 85 in the end of the drive shaft 58. As previously set forth, the drive shaft 58 is provided within the transmission housing 124 with a drive gear 82 which has constant meshing engagement with the gear 125 mounted upon the sleeve 126 by means of splines 127. The sleeve 126 is suitably supported upon bushings or the like on a countershaft 128 journaled at one end in the end 78 of the housing and at the other end in a transverse web 129. Suitable thrust washers 130 at opposite ends of the sleeve retain it in position. Also splined upon the sleeve 126 is an operating gear member 132 having at one end thereof the annular groove or yoke collar 133 for receiving the shifting fork and having at its opposite end the reverse speed idler gear or low speed gear 134 of the transmission. The member 132 is adapted for sliding movement axially on the splines 135 of the sleeve 126 and when shifted axially to the right from the position shown in Figure 2 is adapted to have meshing engagement with the teeth 136 of a gear member 137 which is suitably mounted by means of studs 138 upon the radial flange 139 of a hub member 140 suitably supported by means of bushings upon the shaft 84. Between the gear 137 and the gear 82, the shaft 84 is splined as indicated at 142 to receive the splined hub portions 143 of a synchronizing mechanism which includes an outer synchronizing sleeve 144 internally splined to the hub portion 143 and adapted to have axially sliding movement and coupling engagement with the clutch teeth 145 of the gear 82 whereby the sleeve 144 clutches between the gear 82 and the hub portion 143 to directly couple the shafts 58 and 84 for driving engagement.

The enlarged end of the shaft 58 is also provided with a friction surface 146 adapted to be engaged by the friction cone 147 carried by the synchronizing portion 148 of the clutch 144. The ring or cone is normally urged into frictional engagement with the surface 146 by means of axially directed springs 149 carried within the hub member and bearing against the inner flanged end of the member 148. This particular synchronizing structure is similar to that described in the copending application of O. K. Butzbach, Serial No. 343,938, filed July 5, 1940. The toothed portion 150 of the hub member 143 has formed therein at circumferentially spaced points the poppet balls 152 which are adapted to engage in suitable recesses 153 formed in the internal splines of the sleeve 144 to act as detents therefor whereby initial shifting movement of the member 144 will carry the hub 143 axially to the left to bring the friction surfaces 146 and 147 into positive engagement for synchronizing the speeds of the shafts 84 and 58 prior to moving the clutch sleeve 144 into clutching engagement.

Suitably mounted upon the splines 155 of the shaft 84 is the hub portion 156 of a gear member 157 which has external gear teeth 158 formed adjacent the gear teeth 136 and spaced therefrom by means of the thrust washer 159. The external axially directed portion of the member 157 has bearing engagement on the cylindrical portion 137 of the gear 136 by means of a bushing 160. Mounted within the annular space between the end of the cylindrical portion 137 of the gear 136 and the end flange of the member 157 is an annular ring 162 which is secured to the member 157 by means of the rivets 163. This member forms an internal cylindrical bearing surface to be acted upon by the coils of the helical spring clutch 164. This clutch 164 is anchored at one end as indicated at 165 in Figures 2 and 6 in the end portion of the member 157 and extends axially between the hub 156 and the member 157 and the ring 162 and thence into the annular space between the sleeve 140 of the member 139 and the inner surface or annular portion of the gear member 137. At its inner end the coil spring member is provided with a normally directed lip 166 which is adapted to be engaged by the radially inturned end of a sleeve member 167 carried within the gear member 137 and retained in position therein by means of the snap ring 168.

Mounted upon suitable dowels 170 and studs 172 carried by the flanged portion 139 of the member 140 is a radial plate member 173 which is normally spring-pressed toward the synchronizer sleeve 144 by means of springs 174. The inner end of the studs 172 have secured thereto the annular sleeve member 175 which at its inner end is provided with the recessed or notched portion 176 shown in Figure 6. When the synchronizer sleeve 144 is shifted to the right, as viewed in Figure 2, it abuts against the plate 173 thereby urging the sleeve 175 axially to the right to move the notched portion 176 thereof into engagement with the end 166 of the spring 164. Under such conditions, if the tail shaft 84 is rotating at a faster speed than the engine with the first speed gear 134 in meshing engagement with the gear 136 there will be a difference in relative rotation of the member 157 and the gear member 137 which, in turn, results in a difference in rotation between the member 157 and the member 140 secured to the gear member and carrying the sleeve 175. This results in contraction of the spring coils thereby locking the spring 164 to the external annular surface of the member 140 and providing positive clutching engagement between the member 157 and the member 140 to produce a braking action when, and if, desired so that the engine acts as a brake upon the tail shaft.

With the plate member 173 in the position shown in Figure 2 there is no tendency to contract the coils of the spring 164 and, consequently, these springs will remain in a normal intermediate position in which the member 137 will not be clutched with the member 157. However, when the first speed gear 134 is moved into meshing engagement with the gear teeth 136 and is driven by the shaft 58 it will tend to rotate the gear 136 at a speed greater than the speed of the member 157 since this is the low speed drive through the transmission. As a result the teaser spring 178 will act through the member 167 to energize the coils of the spring 164 in the opposite direction expanding the same to produce a clutching action between the internal annular surface of the gear member 137 and the internal annular surface of the ring 162 secured to the member 157. As a result, as long as the member 137 tends to overdrive the member 157 there will be a positive clutching action caused by expansion of the spring coils and a positive drive to the shaft through the splines 155 will be produced.

However, the shaft 84 tends to overrun with respect to the driving gears 134 and 136, during release of the accelerator prior to shifting. The spring 164 then returns to a neutral position allowing the shaft 84 to overrun relative to the gear 136 so that there is no momentary braking action of the engine during this interval. This overrunning action will be effected as long as the first speed gear is in engaged position with the gear 136 regardless of whether the direct or underdrive is provided through the planetary.

The housing 124 has secured to the rear end thereof the conical housing 180 having a flange 182 secured through the intermediate member 120 to the end of the housing 124 by means of studs 183. The tail shaft 84 extends through the housing 180 and is suitably supported adjacent its rear end by means of the bearing assembly 184 adjacent the rear end 185 of the housing 180. The projecting end of the shaft 84 indicated at 186 is splined to receive the companion flange of a universal joint assembly which connects the tail shaft to the propeller shaft. Disposed within the housing 180 the shaft 84 is provided with a speedometer gear 187 of conventional design and is also provided with a governor mechanism comprising a fixed portion 188 keyed to the shaft 84 and carrying the opposite pivots 189 which through the links 190 are connected to the toggle joints 192 acting as the centrifugally movable members of a governor mechanism connected through the opposite pair of links 193 to pivots 194 carried on a yoke collar 195. It will be apparent that as the speed or rotation of the shaft 84 increases the toggle joints 192 move radially outwardly under the influence of centrifugal force, thereby tending to move the yoke 195 axially to the left along the shaft 84. This results in compression of the double coil springs 196 and 197 which resist this movement and which can be adjusted to control the point at which the yoke collar 195 will move sufficiently to actuate suitable valving mechanism for controlling the shifting within the transmission.

Referring again to the two speed transmission of Figure 2, an idler shaft 200, shown in Figure 5, is provided within the transmission housing and carries thereon an externally splined sleeve 199 slidably receiving the gear 202 which has a yoke portion 201 for receiving a shift fork. The gear 202 is an idler gear carried on the shaft 200 and when moved to the left from the position shown in Figure 2, is adapted to have meshing engagement with the gear teeth 158. The opposite end of the shaft sleeve 199 has a fixed gear 203 adapted to be driven by the gear 134 when in the position shown in Figure 2, whereby the gear 158 is driven in a reverse direction when the gear 202 is shifted to the left from the position shown in Figure 2 into meshing engagement with gear 158. This results in providing reverse drive through the transmission to to the tail shaft as indicated at 155. This reverse drive is independent of the spring clutch and provides a positive reverse from the gear 134 to the gear 203 and thence through the gear 202 to the gear 158. Thus there is no overrunning or free wheeling in reverse drive.

In the form of the invention shown in Figure 3 the spring clutch is eliminated and a more or less conventional type of overrunning clutch indicated at 205 is inserted between the gear 136' and the gear 158'. The gear 158' in this form of the invention is provided with a radially flanged end portion 206 which is rigidly secured as at 207 to a hub member 208 mounted on the splines 155 of the tail shaft 84. The member 208 also has a clutch journal surface 209 forming the inner race for the overrunning clutch 205. The overrunning clutch 205 is mounted in a retainer 210 carried within and preferably cast integrally with a bearing support 212 which at one end forms a thrust flange 213 between the flanged portions of the hub member 208 and the cylindrical extension 214 of the gear member 215 carrying the gear teeth 136'. The retaining member 212 is locked by means of splines or the like for limited rotation relative to the hub member 208 and a suitable coil spring 216 normally urges the clutch assembly into inoperative position.

The gear member 215 is provided with a clutch toothed portion 217 adapted to be engaged by the synchronizer sleeve 144 having the internal teeth mounted on the external toothed portion of the synchronizer hub 143 mounted on the splines 142. Disposed axially upon the clutch teeth 217 the gear member 215 has a friction clutch surface 218 adapted to be engaged by a synchronizing cone 219 carried by the synchronizer hub 143. It will thus be apparent that the synchronizing sleeve 144 can be shifted to the right as viewed in Figure 3 to provide a positive clutch between the shaft 84 and the gear member 215. Thus a positive low speed drive can be provided if desired. However, in normal operation the gear 134 on the countershaft 128 will drive the gear 136' which through the overrunning clutch 205 will pick up and drive the hub member 208 for driving the tail shaft.

Whenever the tail shaft begins to rotate faster than the gear 136' the clutch will function to release engagement therebetween and allow a free wheeling action. The reverse gearing is operated in this form of the invention in the same manner as described in connection with Figure 2. The positive clutch between the gear 136' and the shaft 84 is for the purpose of being able to crank the motor by moving the vehicle and provides a construction corresponding to that shown in the copending Greenlee application, Serial No. 358,393, filed September 26, 1940.

In the construction shown in Figure 4 the mechanism is substantially the same as shown in Figure 2 with the exception that the gear teeth 158 have been removed from the member 157. This then requires that the reverse slider 202 be moved to the left so that it can be moved into clutching engagement with the gear 136 instead of within the gear 158. The spring clutch arrangement functions in exactly the same manner as previously described, allowing the gear 136 to couple to the shaft through the member 157 by expansion of the clutch coils and to be uncoupled from the member 157 when this member tends to overrun the gear 136. The advantage of such a construction is the elimination of the gear teeth 158 thereby reducing materially the cost of the construction and the shortening of the shaft portions on which the reverse gears 202 and 203 are mounted. It will be apparent that whenever the gear 134 is shifted into meshing engagement with the gear 136 in any of the forms of the invention shown in Figures 2 to 4, the lay shaft 200 will be uncoupled from any gearing engagement and, consequently, will not be rotated. This is of distinct advantage. One of the distinctions between the construction shown in Figure 2 and that shown in Figure 4 is the fact that the reverse drive in the latter form of the invention is coupled to the tail shaft 84 through the spring clutch 164, this clutch being reversely energized under such conditions to provide the coupling engagement.

The shifting mechanism for the gears 134 and 202 is shown somewhat diagrammatically in Figure 5. It will be seen that the transmission housing 124 is provided with a side opening indicated at 220. Disposed in vertically spaced arrangement within this opening are the shift rails 222 and 223 mounted in suitable journals formed in the transmission housing. Each of the shift rails is provided with a shifter fork indicated at 224 and 225 having projecting notched lug portions 226 and 227, respectively, adapted to be engaged by any suitable actuating means for shifting the fork and rail axially to move the respective gears into the desired position. The shifter forks 224 and 225 have yoke portions engaged in the corresponding collars 201 and 133 of the respective gears. Preferably the transverse web or partition 228 formed in the transmission housing for supporting the lay shaft 200 is provided with a suitable pin member 229 extending longitudinally of the transmission and providing a support for the notched portion 230 of the shifter fork 224 to maintain it in position without imposing any radial stress upon the yoke portion 201 of the gear 202. The particular mechanism by which the forks 224 and 225 are shifted forms no part of the present invention but suffice it to say that the actuating means is hydraulically controlled by means of suitable valves and pistons which are operated in accordance with the governor mechanism shown in Figure 2, so far as shifting the clutch sleeve 144 is concerned. So far as the reverse idler gear is concerned, the shifting of this gear can be manually controlled by a simple lever which moves the gear into meshing engagement with either the gear 136 or the gear 158 and when in its opposite position shifts the gear 202 into neutral position.

Considering now in detail the mechanism shown in Figure 8, this is a revised arrangement of the piston construction for the piston 112 and the ring 70 of Figure 1 and provides a more desirable design insofar as actuation of the gear is concerned.

In Figure 8 this ring is formed in two pieces, the portion 235 having an axially extending piston portion 236 slidably mounted within an annular cylinder 237. Bolted to the portion 235 is an annulus 238 suitably formed to have locking engagement in the splines 74 of the housing 26 to prevent rotation of the piston. The housing 26 is provided with circumferentially spaced boss portions 240 which are provided with longitudinally drilled passageways 242 and radial passageways 243 for admitting fluid, under pressure, into the cylinder 237 to actuate the piston 236. With the clutch torque transmitting member 50 in neutral position, that is, intermediate the member 235 and the ring gear 45, the shift from this neutral position to underdrive is accomplished as follows:

The piston 67 is provided with a port 245 for admitting fluid, under pressure, to the right-hand end thereof and is also provided with a passageway 247 which, through the passageway 248 and the port 249, is adapted to admit fluid, under pressure, to the left-hand side of this piston which controls the shifting movement of the clutch and brake member 50. Thus, in shifting from neutral to underdrive, oil pressure is supplied through the ports 243 and 249 with the pressure in the line 247 being greater than the pressure in the line 242. As a result, the piston 67 tends to move to the right while the piston 236 has a tendency to move to the left. This produces immediate engagement between the friction surfaces 68 and 69 and due to the differential in pressure causes the piston 236 as well as the piston 67 to move to a stopped position with the portion 235 resting against the shoulder formed by the end of the cylinder 94' and with the piston 67 urged to its furthermost right-hand position. This provides a minimum loss of time for producing engagement between the surfaces 68 and 59 when a shift from neutral to underdrive is made.

To effect a shift from the underdrive position to a direct drive through the planetary which requires locking of the sun gear 59 to the ring gear 45, the pressure in the port 243 is increased to extend the pressure in the passageway 247. As a result, both the piston 236 and the piston 237 are carried to the left so that the friction surface 49 of the torque transmitting member 50 engages the cone 46. Through this shifting movement the underdrive is maintained which is an important feature. As the two pistons are moved to the left a suitable slot 250 in the piston 236 communicates with the outlet port 246 and a suitable time interval, due to the size of the opening and the arrangement of the pressure controlled system, is provided during which the friction surfaces 49 and 46 are momentarily held as a suitable hydraulic valving mechanism trips to apply pressure to the port 245, thereby forcing the member 66 positively to the left in order to hold the surfaces 49 and 46 in driving engagement while the bleeding of the pressure from the cylinder 237 outwardly through the port 246 releases the pressure on the portion 235. It will be noted that at this time the friction surfaces 49 and 46 are positively engaged for direct drive while the piston 236 which is now unloaded of pressure from the port 243 due to the bleeding off, floats back to its extreme right-hand position under the influence of springs (not shown), thus permitting running clearance between the friction surfaces 68 and 69. The planetary, under this set of conditions, is locked for direct drive with the ring gear and sun gear allowing for conjoint rotation between the friction surfaces 49 and 46.

In order to shift back from the direct drive to underdrive, oil pressure is again applied through the passageway 242 into the right-hand end of the cylinder 237 with a greater pressure being applied through the passageway 247 into the port 249. However, this greater pressure in the port 249 is higher or equals the pressure through the port 245 and thus there is no axial movement in the piston 67 until the pressure is released at the port 245. However, during this time the portion 235 first travels to the left so that its slot engages with the port 246 and a bleeding off is thus provided so that the torque transmitting member 50 is momentarily held during the interval in which the hydraulic valve in the control is shifted to reduce the pressure at the port 245.

The release of pressure in the port 245 causes the pressure at the left-hand side of the piston 67 to become greater than the pressure in either the port 245 or the port 243 and the entire assembly of the member 235, torque transmitting member 50 and piston 67 moves to the right into the position described above for producing an under drive with the sun gear locked against rotation by the positive engagement of the surfaces 68 and 69. This provides running clearance between the friction surfaces 69 and 46 and also insures that as soon as the pressure is introduced to the passageway 242 the parts will be locked in underdrive and will remain in underdrive during the shifting thereof to the right out of engagement between the friction surfaces 49 and 46.

Considering now the operation of the structure as disclosed in the instant application, it will be apparent that whenever the motor of the vehicle is operating, the sleeve 16 will be rotating and thereby operating the gear pump 33—34 to force a supply of oil into the fluid coupling B. As the engine speed increases the impeller of the coupling will start to drive the rotor 18 thereby rotating the shaft 17 upon which is carried the ring gear member 45. So long as the member 50 remains in the neutral position shown this will result in merely idling operating of the mechanism as the sun gear is free to rotate.

If it is desired to start the vehicle off in its lowest speed ratio the gear 134 in the transmission is shifted into meshing engagement with the gear 136 and is allowed to remain in this position throughout the normal forward driving range. This shift can be controlled by a small lever on the steering column which merely is shifted in one direction to effect a forward drive and in the opposite direction is operable to shift the gear 202 into engagement with the gear 158. The remainder of the drive can be automatic in operation. As the shaft 17 is driven from the fluid coupling, fluid pressure is applied as described hereabove through the ports 243 and 249, or through the ports 114 and 115, to the left-hand side of the piston 67 in the construction shown in Figure 1, with the pressure in the left-hand side of the cylinder housing of piston 67 being greater than the pressure at 114 or at 243. This produces the pressure differential causing the torque transmitting 50 to move to the right until it rests against the housing 26. During this movement the brake faces 68 and 69 are locked in positive driving engagement, thereby locking the sun gear against rotation to produce the underdrive through the planetary system. As a result, the ring gear 45 of the planetary drives the spider 55, carrying the planet pinions, and consequently drives the shaft 58 which through the countershaft 135 and the gear 134 drives the gear 136 in the transmission. This gear is free to rotate relative to the shaft 84 but as it starts to overrun with respect to the gear 157 the spring 164 is energized, thereby effecting a friction clutching engagement between the gears 136 and 157 so that the drive is transmitted to the main shaft 84.

As the speed of this shaft increases, the governor mechanism in the housing 180 begins to function, moving the shift collar 195 to the left. This, in turn, operates a suitable valve mechanism in a fluid controlled circuit for shifting the synchronizer sleeve 144 into engagement with the clutch teeth 145 of the gear 82, thereby producing a direct drive between the shafts 58 and 84. This direct drive can be effected while the gear 134 remains in meshing engagement with the gear 136 since the gear 137 is free to overrun relative to the gear 156. Thus, a direct drive through the transmission is effected which is preceded by an underdrive through the planetary system. As the speed further increases the sleeve 144 is shifted out of engagement. Simultaneous with the shifting of the sleeve 144 out of engagement, the hydraulic control system functions to shift the planetary system from a low ratio drive to direct drive. This is accomplished by shifting the member 70 to the left and at the same time holding the member 50 in positive engagement with the ring gear 45. As the member 70 moves into a position to engage the brake surfaces 68 and 69 there is a momentary time interval during the tripping of the hydraulic valve which controls the fluid pressure at the right-hand side of the piston 67. As pressure is applied to the right-hand side of the piston 67, pressure is released at the left-hand side of this piston and also at the left-hand side of the piston 112. The springs therefore move the member 70 out of driving engagement while the pressure maintains the member 50 in its left-hand position to engage the clutch surfaces 46 and 49 for positive drive. This locks the sun gear and ring gear together for conjoint rotation. The direct drive through the planetary rotates the shaft 58 conjointly with the shaft 17 and, in turn, drives the shaft 84 through the reduction gear in the countershaft in the same manner as previously described.

As the torque speed increases further the governor mechanism may function to shift the synchronizer sleeve to a position effecting direct drive between the shafts 58 and 84, thereby producing direct drive from the fluid coupling through the entire transmission structure.

It is to be understood that the particular control means and the particular sequence of the drives can be varied as desired. For example, the drive can be an underdrive through the planetary and a reduction through the transmission, then a shift to a direct drive through the planetary with a reduction through the transmission and a subsequent direct drive eliminating the reduction change in the transmission. Optionally, the drives could be arranged to provide an underdrive through the planetary with a reduction through the transmission, then a shift to direct drive in the transmission and a final shift into direct drive through the planetary. Thus, by properly arranging the control system the present construction is capable of a combination of different driving ratios, available for use and controlled in accordance with the torque and speed conditions encountered.

If it is desired to effect reverse drive, the gear 134 while in neutral is in constant mesh with the gear 203 of lay shaft 200. The gear 202 is then shifted into engagement with the gear 153 whereby upon actuation of the member 50 reverse drive can be effected to the gear 157 and thence to the shaft 84 either in underdrive or direct drive through the planetary although preferably this will be arranged to operate through the underdrive of the planetary.

If it is desired to use the motor as a brake, as, for example, coming down hill, the synchronizer sleeve 144 can be shifted rearwardly to engage the plate 173 which, in turn through the sleeve 175 energizes the spring 164 in a reverse direction thereby coupling the gear 157 to the gear 136 and consequently coupling the shaft 84 back through the reduction gearing to the engine through the fluid coupling to provide an engine brake for retarding the speed of the vehicle when coasting. This can be either manually or automatically controlled.

The forms of the invention shown in Figures 3 and 4 will provide similar operating sequences, the only difference between Figure 2 and Figure 3 being the use of an overrunning clutch 205 in place of the spring 164 and the provision of means for directly coupling the gear 136' to the shaft 84 in place of using the plate 173 and reversing the energization of the spring 164.

In Figure 4 a construction substantially identical with Figure 2 is provided, except that the teeth 158 of the member 157 are eliminated and the reverse gear 202 is adapted to be shifted directly into engagement with the gear 136. In its other respects, this construction is the same in so far as the operating sequences are concerned.

Similarly, the means for operating the friction member 70 can be varied as shown in Figure 8 in which a different type of piston arrangement is provided. However, the functions are equivalent but in this form of the invention the equalizing or neutralizing member of Figure 7 is eliminated as the piston 67 can be centered in position by the use of pressure alone, if so desired.

It is therefore believed apparent that we have provided a novel type of fluid coupled transmission which is capable of automatic operation and which provides all the various driving ratios necessary to utilize the transmission under various conditions. For example, on straight level driving it will probably never be necessary to employ the underdrive of the planetary in conjunction with the reduction gearing, but it might be highly desirable in muddy weather or for hill climbing or the like when greater speed reduction is required.

We are aware that numerous changes may be made in certain details of construction of the present invention and in details of the various elements disclosed in the instant application and we therefore do not intend to be limited except as defined by the scope and spirit of the appended claims.

We claim:

1. In a transmission having a fluid coupling and connecting power source therewith, a planetary gear system including a ring gear driven by said coupling having an external conical friction surface, a planet spider having pinions driven by said ring gear, a shaft driven by said spider, a sun gear rotatably mounted on said shaft and in meshing engagement with said pinions, a torque transmitting member shiftable axially upon said sun gear and having inner and outer conical friction surfaces extending in the same direction as the friction surface of said ring gear, an axially shiftable non-rotatable brake member having a conical friction surface extending in the same direction and substantially parallel with the outer friction surface of said torque transmitting member, fluid actuated means for shifting said torque transmitting member, and fluid actuating means for shifting said non-rotatable brake member, said last two means being actuatable to couple said sun gear to said ring gear or to said non-rotatable brake member, optionally.

2. The combination of claim 1 characterized by the provision of means for positioning said torque transmitting member so that the friction surfaces thereof are out of engagement with the friction surfaces of said ring gear and said non-rotatable brake.

3. In combination, a fluid coupling including a driven shaft having a ring gear at the end thereof, a planet spider having pinions driven by said ring gear, a sun gear, a clutch member coupled to said sun gear and optionally shiftable axially thereon to lock said sun gear to said ring gear or to lock said sun gear against rotation, fluid actuated means including an annular piston for selectively shifting said clutch member axially in opposite directions, said annular piston having an external annular groove, and radially disposed fluid operated means for centering said piston in neutral position.

4. In a planetary gear system for a transmission, a housing, an annular friction member non-rotatably located within said housing for axial shifting movement, a drive shaft, a planetary ring gear connected to said drive shaft and having an external friction surface in radial alinement with said friction member, a planet spider having planet pinions driven by said ring gear, a driven shaft connected to said spider, a sun gear for said system, a torque transmitting member splined on said sun gear and shiftable axially thereon, said torque transmitting member having inner and outer friction surfaces for engaging the friction surface of said ring gear and said annular friction member, respectively, means for selectively shifting said torque transmitting member, and means for selectively shifting said annular friction member, said last two means being actuatable to connect said ring gear and said sun gear together to effect a direct drive through said system or to prevent rotation of the sun gear to effect a ratio drive through said system, optionally, while maintaining continuous torque to the driven shaft.

5. The combination of claim 4 characterized by the provision of means for positioning said torque transmitting member to dispose the friction surfaces thereof out of engagement with the friction surfaces of said ring gear and said annular friction member.

6. In a planetary system for a transmission, a housing, an annular friction member non-rotatably located within said housing for axial shifting movement, a planetary ring gear having an external friction surface in radial alinement with said annular friction member, a sun gear for said system, a torque transmitting member for said sun gear having a peripheral portion lying between said friction member and said ring gear friction surface, means for shifting said torque transmitting member axially to lock said sun gear to said ring gear or to lock said sun gear to said friction member, said means comprising an annular piston, and means for selectively admitting fluid under pressure to each end of said piston and radially movable fluid actuated means for forcing said piston into neutral position.

7. In combination, a fluid coupling, a planet gear system including a ring gear driven from said coupling, a sun gear, and a pinion spider, a shaft driven by said spider and having drive gear means thereon, a transmission main shaft journalled at one end therein, fluid operated means for simultaneously locking said sun gear and ring gear against rotation and selectively releasing said ring gear for rotation or releasing said ring gear and sun gear for conjoint rotation to provide an underdrive or direct drive to said driven shaft, and fluid control means operable to return said locking means to neutral position.

8. A planetary gear system adapted to be interposed between a fluid coupling and a transmission, comprising a ring gear driven by said coupling, a planet spider for transmitting drive to said transmission, a sun gear, a first axially shiftable torque transmitting member keyed to said sun gear, a non-rotatable axially shiftable braking member overlying said torque member, and selectively operable control means for each of said torque transmitting and braking members for coupling said sun gear to said ring gear, or to said braking member or to both.

9. The combination of claim 8 wherein said torque transmitting and said clutching members are shiftable selectively or conjointly in either direction under selective influence of said control means.

10. In a planetary gear system adapted to be interposed between a fluid coupling and a change speed transmission, including a ring gear, a sun gear and planet spider having pinions geared therebetween, a first clutching member splined on said sun gear and axially shiftable in opposite directions from a neutral position, a housing enclosing said system, a non-rotatable axially shiftable ring member in said housing, said ring member and ring gear having radially spaced coaxial overlapping friction surfaces, said clutching member having a corresponding coaxial clutch portion interposed in said space and optionally engageable with each of said surfaces upon axial shifting, and means for selectively shifting said ring member to engage said clutch portion when in one shifted position and to maintain said engagement as said clutch member is shifted to its other shifted position.

11. A planetary gear system adapted to be interposed between a fluid coupling and a transmission, comprising a ring gear driven by said coupling, a planet spider adapted to be driven by said ring gear, a sun gear, a torque transmitting member keyed to said sun gear and shiftable axially thereon, a non-rotatable axially shiftable brake member overlying said torque member, selectively operable control means for said torque transmitting member and said non-rotatable brake member for coupling said sun gear to said ring gear, or to said non-rotatable brake member, or to both, and means for maintaining said torque transmitting member in neutral position.

HARRY R. GREENLEE.
LOREN D. BRITTON.
JOHN R. BOND.